US011960576B2

(12) United States Patent
Zhang et al.

(10) Patent No.: US 11,960,576 B2
(45) Date of Patent: Apr. 16, 2024

(54) ACTIVITY RECOGNITION IN DARK VIDEO BASED ON BOTH AUDIO AND VIDEO CONTENT

(71) Applicant: Inception Institute of Artificial Intelligence Ltd, Abu Dhabi (AE)

(72) Inventors: Yunhua Zhang, Amsterdam (NL); Xiantong Zhen, Amsterdam (NL); Ling Shao, Abu Dhabi (AE); Cees G. M. Snoek, Amsterdam (NL)

(73) Assignee: Inception Institute of Artificial Intelligence Ltd, Abu Dhabi (AE)

( * ) Notice: Subject to any disclaimer, the term of this patent is extended or adjusted under 35 U.S.C. 154(b) by 179 days.

(21) Appl. No.: 17/380,471

(22) Filed: Jul. 20, 2021

(65) Prior Publication Data

US 2023/0039641 A1 Feb. 9, 2023

(51) Int. Cl.
*G06K 9/62* (2022.01)
*G06F 18/20* (2023.01)
*G06F 18/2413* (2023.01)
*G06F 18/25* (2023.01)
*G06N 3/045* (2023.01)
*G06N 3/0464* (2023.01)
*G06V 10/82* (2022.01)
(Continued)

(52) U.S. Cl.
CPC ...... *G06F 18/253* (2023.01); *G06F 18/24137* (2023.01); *G06F 18/256* (2023.01); *G06F 18/285* (2023.01); *G06N 3/045* (2023.01); *G06N 3/0464* (2023.01); *G06V 10/82* (2022.01); *G06V 20/41* (2022.01); *G06V 20/46* (2022.01); *G10L 25/27* (2013.01)

(58) Field of Classification Search
None
See application file for complete search history.

(56) References Cited

U.S. PATENT DOCUMENTS 9,275,289 B2* 3/2016 Li ........................... G06T 7/254
9,661,327 B2* 5/2017 Nilsson ................. G06V 20/36
10,565,429 B2* 2/2020 Chukka ............... G06F 18/2413
(Continued)

OTHER PUBLICATIONS

Wu et al., "Exploring Heterogeneous Clues for Weakly-Supervised Audio-Visual Video Parsing," 2021 IEEE/CVF Conference on Computer Vision and Pattern Recognition (CVPR), Nashville, TN, USA, 2021, pp. 1326-1335, doi: 10.1109/CVPR46437.2021.00138. (Year: 2021).*

(Continued)

*Primary Examiner* — Feng Niu
(74) *Attorney, Agent, or Firm* — Stetina Brunda Garred & Brucker (57) ABSTRACT

Videos captured in low light conditions can be processed in order to identify an activity being performed in the video. The processing may use both the video and audio streams for identifying the activity in the low light video. The video portion is processed to generate a darkness-aware feature which may be used to modulate the features generated from the audio and video features. The audio features may be used to generate a video attention feature and the video features may be used to generate an audio attention feature. The audio and video attention features may also be used in modulating the audio video features. The modulated audio and video features may be used to predict an activity occurring in the video.

17 Claims, 5 Drawing Sheets

(51) Int. Cl.
   *G06V 20/40*      (2022.01)
   *G10L 25/27*      (2013.01)

(56) References Cited

U.S. PATENT DOCUMENTS

| | | | | |
|---|---|---|---|---|
| 10,574,883 | B2* | 2/2020 | Purwar | H04N 5/445 |
| 2010/0265414 | A1* | 10/2010 | Nieuwlands | H04N 9/73 |
| | | | | 348/739 |
| 2015/0043655 | A1* | 2/2015 | Nilsson | H04N 19/136 |
| | | | | 375/240.26 |
| 2015/0278616 | A1* | 10/2015 | Li | G06V 10/764 |
| | | | | 382/103 |
| 2017/0243051 | A1* | 8/2017 | Chukka | G06F 18/254 |
| 2018/0352150 | A1* | 12/2018 | Purwar | G06T 7/536 |
| 2019/0258862 | A1* | 8/2019 | Kim | H04N 7/183 |
| 2021/0103733 | A1* | 4/2021 | Jiang | G06N 3/04 |

OTHER PUBLICATIONS

Palash Goyal et al: "Cross-modal Learning for Multi-modal Video Categorization", arxiv.org, Cornell University Library, 201 Olin Library Cornell University Ithaca, NY 14853, Jun. 6, 2020 (Jun. 6, 2020) XP081686929.

Katsaggelos Aggelos K et al: "Audiovisual Fusion: Challenges and New Approaches", Proceedings of the IEEE, vol. 103, No. 9, Sep. 1, 2015 (Sep. 1, 2015), pp. 1635-1653, XP011667043, IEEE, New York, US, ISSN: 0018-9219, DOI: 10.1109/JPROC.2015.2459017 [retrieved on Aug. 20, 2015].

Xu Haoming Xuhaoming CS@Gmail Com et al: "Cross-Modal Relation-Aware Networks for Audio-Visual Event Localization", Proceedings of the 28th ACM International Conference on Multimedia, ACMPUB27, New York, NY, USA, Oct. 12, 2020 (Oct. 12, 2020), pp. 3893-3901, XP058478204, DOI: 10.1145/3394171.3413581, ISBN: 978-1-4503-7988-5.

Mathilde Brousmiche et al: "Audio-visual Fusion and Conditioning with Neural Networks for Event Recognition", 2019, 6 pages.

Chengyang Li et al: "Illumination-aware Faster R-CNN for Robust Multispectral Pedestrian Detection", Aug. 14, 2018, 14 pages.

European Patent Office, European search report for Application No. 21198840.7-1207, dated Mar. 16, 2022, 13 pages.

Anonymous CVPR 2021 Submission, "Kaleido-Bert: Vision-Language Pre-training on Fashion Domain", 2021, 11 pages.

Anonymous CVPR 2021 Submission, "Kaleido-Bert: Vision-Language Pre-training on Fashion Domain (Supplementary Materials)", 2021, 13 pages.

Anonymous ICCV Submission, "Sound and Sight Recognize Activity in the Dark", 2021, 11 pages Anonymous CVPR 2021 Submission, "Repetitive Activity Counting by Sight and Sound", 2021, 9 pages.

* cited by examiner

ACTIVITY RECOGNITION IN DARK VIDEO BASED ON BOTH AUDIO AND VIDEO CONTENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

Field of the Invention

The current disclosure relates to video processing and in particular to identifying activities occurring in video that may be captured under poor lighting conditions.

Background

Videos can be processed in order to identify activities occurring in the video. Identifying the activities in video has a number of applications including monitoring a video stream for identifying a possible activity such as a vehicle accident, a person tripping or falling. The processing may also be used in automatically, or semi-automatically labelling or classifying videos or portions of videos, for example providing a timeline of activities in the video. Videos may be captured under a wide range of lighting conditions including in dark environments, which makes identifying activities occurring in the video more difficult. Existing computer vision solutions may attempt to deal with dark environments by image enhancement or with the use of (near-)infrared sensors. However, image enhancement can fail when it is too dark and infrared sensors are sensitive to environment factors, such as temperature, smoke, dust and haze.

Recently, there has been a rise of research interest with regards to computer vision tasks in a dark environment, such as crowd counting, pedestrian detection, multiple object detection and tracking. Previous techniques have proposed to aid crowd counting in challenging vision conditions by utilizing the ambient sound, while they treat images under various illuminations equally and the sound signals cannot make predictions alone when the image quality is too poor to rely on. Though progress has been made in video analysis under normal illuminations, very few techniques have been proposed for dark environments, and all have relied upon processing of the visual content. One of these techniques use infrared images to provide human activity information for dark environments, with the model trained with a dataset focusing on six human activity classes, like waving, clapping and running. Other processing techniques have used a novel optical flow estimation method under low-light conditions.

Analyzing sound has recently proven advantageous in a variety of computer vision challenges, such as representation learning by audio-visual synchronization video captioning sound source localization to name a few. Correspondingly, several mechanisms for fusing both the sight and sound modalities have been introduced, among which cross-modal attention is broadly developed. Techniques for sound source localization can produce attention maps for the visual features from the audio signals. Previous techniques have used a hybrid attention scheme to integrate the audio and the visual modalities for video parsing, while other techniques use cross-modal attention in a multi-stage manner for weakly-supervised action localization. Several works have utilized the merits of sound for activity recognition in videos. As processing audio signals is much faster than frames of videos, some previous techniques have used audio processing to reduce the computational cost by previewing the audio track for video analysis. Other techniques have used the integration of sight and sound for audiovisual event localization. Other processing techniques have used a new model for audio-visual video parsing, which is able to recognize and localize audible, visible, and audible-visible events. Still other techniques have used the sound modality to provide useful complementary information for weakly-supervised action localization.

Previous processing attempts have demonstrated the benefit of audio signals for various computer vision challenges. The synchronization attribute of sight and sound is broadly utilized for self-supervised learning and exploring unseen status for reinforcement learning. Combining with visual features, the mono audio can be converted to binaural and stereophonic sound. Various cross-modal interaction mechanisms have been proposed. In some works, the features from both modalities are simply fused by concatenation. Cross-modal attention has been effective in event localization sound source separation and localization, and video parsing. However, existing works that combine sight and sound are commonly target at restricted domains, such as speech, music or activities that make characteristic audio signals, while many cases in practice may contain background sound only. In addition, the tradition that the training and the testing sets always come from the same domains also makes the audiovisual models less suitable for usage in the wild.

An additional, alternative and or improved process for identifying activities in video including both audio and visual content captured in dark conditions is desirable.

BRIEF SUMMARY

In accordance with the present disclosure there is provided a method for identifying an activity occurring in media content captured in different possible lighting conditions including low light conditions, comprising: receiving the media content comprising video content and audio content; extracting video features from at least a portion of the video content using a video model; extracting audio features from at least a portion of the audio content using an audio model; generating a darkness-aware feature by applying the video features to a darkness-aware evaluation model; modulating the video features and the audio features based on the darkness-aware feature; and predicting an activity occurring in the media content based on the modulated video and audio features.

In an embodiment of the method, modulating the video features and audio features based on the darkness-aware feature comprises: generating a video attention feature from the portion of the audio content; generating an audio attention feature from the portion of the video content; modulating the video features based on the video attention feature and the darkness-aware feature; and modulating the audio features based on the audio attention feature and the darkness-aware feature.

In an embodiment of the method, predicting an activity occurring in the media content comprises: generating an audio prediction based on the modulated audio features; generating a video prediction based on the modulated video features; and combining the audio prediction and the video prediction to predict the activity occurring in the media content.

In an embodiment of the method, generating the video prediction comprises adjusting classification boundaries of a video classifier based on the darkness-aware feature.

In an embodiment of the method, generating the audio prediction comprises adjusting classification boundaries of an audio classifier based on the darkness-aware feature.

In an embodiment of the method, combining the audio prediction and the video prediction comprises averaging the audio prediction and the video prediction together.

In an embodiment of the method, the video feature is generated according to: $F'_v = M_v \odot F_v$, wherein the modulated audio feature is generated according to: $F'_a = M_a \odot F_a$, where: $F'_v$ is the modulated video feature; $F'_a$ is the modulated audio feature; $M_v$ is the video attention from the portion of the audio content; $M_a$ is the audio attention from the portion of the video content; $F_v$ is the extracted video features; $F_a$ is the extracted audio features; and $\odot$ indicates channel-wise multiplication.

In an embodiment of the method, the darkness-aware feature is generated according to: $f_d = \Phi'_d(F_v)$, where: $f_d$ is the darkness-aware feature; $\Phi'_d$ denotes a module obtained by removing a final layer from $\Phi_d$; $\Phi_d$ is a darkness-aware model trained to produce darkness-aware features comprising a 3D residual block followed by a fully connected layer; and $F_v$ is the extracted video features.

In an embodiment of the method, extracting the audio feature from at least a portion of the audio content comprises transforming the audio content to a spectrogram and applying the spectrogram to the audio model.

In an embodiment of the method, the video model is trained on video content captured in well lit conditions.

In accordance with the present disclosure there is further provided a non-transitory computer readable memory storing instructions which when executed by a processor of a computer system configure the computer system to perform a method comprising: receiving the media content comprising video content and audio content; extracting video features from at least a portion of the video content using a video model; extracting audio features from at least a portion of the audio content using an audio model; generating a darkness-aware feature by applying the video features to a darkness-aware evaluation model; modulating the video features and the audio features based on the darkness-aware feature; and predicting an activity occurring in the media content based on the modulated video and audio features.

In an embodiment of the computer readable memory, modulating the video features and audio features based on the darkness-aware feature comprises: generating a video attention feature from the portion of the audio content; generating an audio attention feature from the portion of the video content; modulating the video features based on the video attention feature and the darkness-aware feature; and modulating the audio features based on the audio attention feature and the darkness-aware feature.

In an embodiment of the computer readable memory, predicting an activity occurring in the media content comprises: generating an audio prediction based on the modulated audio features; generating a video prediction based on the modulated video features; and combining the audio prediction and the video prediction to predict the activity occurring in the media content.

In an embodiment of the computer readable memory, generating the video prediction comprises adjusting classification boundaries of a video classifier based on the darkness-aware feature.

In an embodiment of the computer readable memory, generating the audio prediction comprises adjusting classification boundaries of an audio classifier based on the darkness-aware feature.

In an embodiment of the computer readable memory, combining the audio prediction and the video prediction comprises averaging the audio prediction and the video prediction together.

In an embodiment of the computer readable memory, the video feature is generated according to: $F'_v = M_v \odot F_v$, wherein the modulated audio feature is generated according to: $F'_a = M_a \odot F_a$, where: $F'_v$ is the modulated video feature; $F'_a$ is the modulated audio feature; $M_v$ is the video attention from the portion of the audio content; $M_a$ is the audio attention from the portion of the video content; $F_v$ is the extracted video features; $F_a$ is the extracted audio features; and $\odot$ indicates channel-wise multiplication.

In an embodiment of the computer readable memory, the darkness-aware feature is generated according to: $f_d = \Phi'_d(F_v)$, where: $f_d$ is the darkness-aware feature; $\Phi'_d$ denotes a module obtained by removing a final layer from $\Phi_d$; $\Phi_d$ is a darkness-aware model trained to produce darkness-aware features comprising a 3D residual block followed by a fully connected layer; and $F_v$ is the extracted video features.

In an embodiment of the computer readable memory, extracting the audio feature from at least a portion of the audio content comprises transforming the audio content to a spectrogram and applying the spectrogram to the audio model.

In an embodiment of the computer readable memory, the video model is trained on video content captured in well lit conditions.

In accordance with the present disclosure, there is further provided a computer system comprising: a processor for executing instructions; and a memory storing instructions, which when executed by the processor configure the computer system to perform a method comprising: receiving the media content comprising video content and audio content; extracting video features from at least a portion of the video content using a video model; extracting audio features from at least a portion of the audio content using an audio model; generating a darkness-aware feature by applying the video features to a darkness-aware evaluation model; modulating the video features and the audio features based on the darkness-aware feature; and predicting an activity occurring in the media content based on the modulated video and audio features.

BRIEF DESCRIPTION OF THE DRAWINGS

Further features and advantages of the present disclosure will become apparent from the following detailed description, taken in combination with the appended drawings, in which.

DETAILED DESCRIPTION

Exploiting sound for video activity recognition in the dark can improve the activity prediction. As described further below, darkness-aware cross-modal interactions provide complementary information to a sight model and improve the activity predictions when the video is captured in dark conditions since audio signals are considered to be free of visual noise and can provide complementary information in the dark. The process described below exploits both audio and visual content of the video to identify activities that were captured in a dark environment, rather than using image enhancement techniques that can be computationally expensive. The model described below includes a darkness evaluation module that can dynamically adjust cross-modal interactions according to the darkness conditions of the video's visual content. The process may also combine both the audio and visual content of the video by cross-modal attention.

The audio signals are robust in the dark and the outcome of cross-modal interaction can be sensitive to illuminations. While sound can be an important cue for recognition in the dark, the noise of the visual content should be taken into consideration. Accordingly, the process described below may control the cross-modal interaction considering the conditions of the visual content of the video and therefore exploit complementary information for each modality from the other.

The process described herein provides video activity recognition in the dark based on not only the sight but also the sound signals. The activity recognition can be applied to either live or recorded videos. The process may use an audio visual model with both a sight and a sound stream, where each stream facilitates each modality to predict classification result. As the illumination conditions may vary in different videos, a darkness evaluation module may be used to produce a darkness-aware feature representation for each video based on the conditions of the visual content. The darkness-aware feature may then be used to modulate features used by the audio and visual streams for predicting activities in the video. The darkness-aware feature may be used to modulate the cross-modal channel attention and classifier boundaries.

In order to train and test the current activity prediction models, four sight and sound datasets were derived from XD-Violence dataset, Kinetics-Sound dataset and Moments-in-Time dataset, for activity recognition in the dark. Three of these datasets are used for supervised learning and evaluation and the other for assessing the generalization ability from daylight to darkness. Experiments were conducted that demonstrate the benefit of sound, as well as the other introduced network modules, for activity recognition in the dark. The experiments show that the sight and sound model, trained on daytime data only, can generalize well to nighttime videos.

Figure 1:
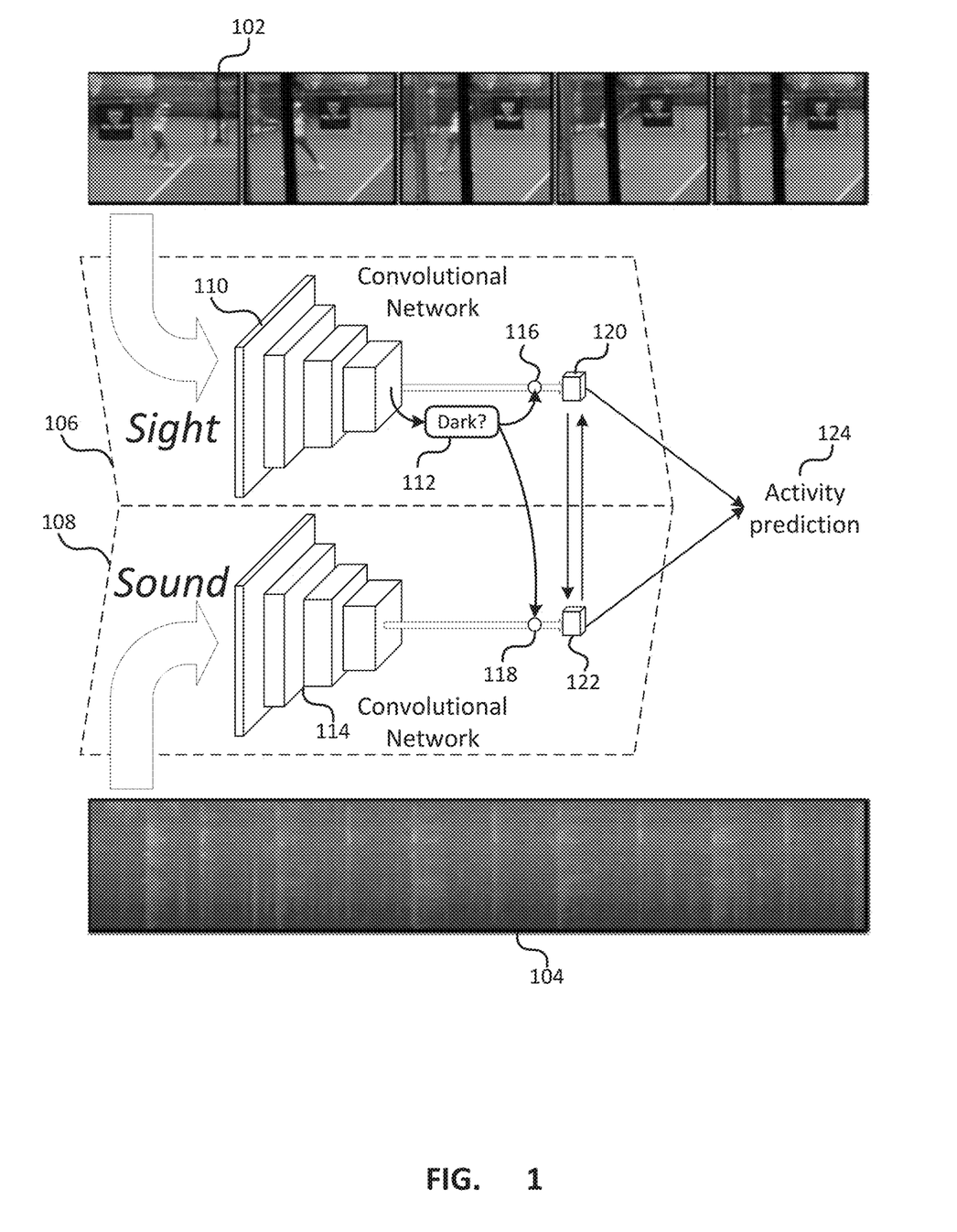
FIG. 1 depicts a process for predicting an activity from video comprising audio and video captured in a dark environment.

FIG. 1 depicts a process for predicting an activity from video comprising audio and video captured in a dark environment. Given a video that has a visual portion 102 and an audio portion 104, a processing model 100 may include a visual network 106 that may be trained under normal illuminations, and a corresponding audio stream 108. The goal of the model 100 is to recognize the activity happening in the video that was captured under low illuminations. To achieve this, the model includes a number of modules adapted for dark environments. The visual network 106 may include a convolutional neural network 110, or similar structure, for feature extraction. A darkness evaluation module 112 assesses the extent to which discriminative information can be extracted from the current visual input video. The audio network 108 may also include a convolutional neural network 114, or similar structure for feature extraction. Both the visual and audio networks 106, 108 may include darkness-aware cross-modal channel attention modules 116, 118 that each produce a channel attention feature vector for the respective stream considering the other stream and the darkness-aware feature. Since the feature distribution of an activity class can deviate from the one under normal illuminations, and as such the darkness-aware activity prediction may use a visual classifier 120 and an audio classifier 122 that rectify the classification boundaries according to the darkness-aware feature.

Figure 2:
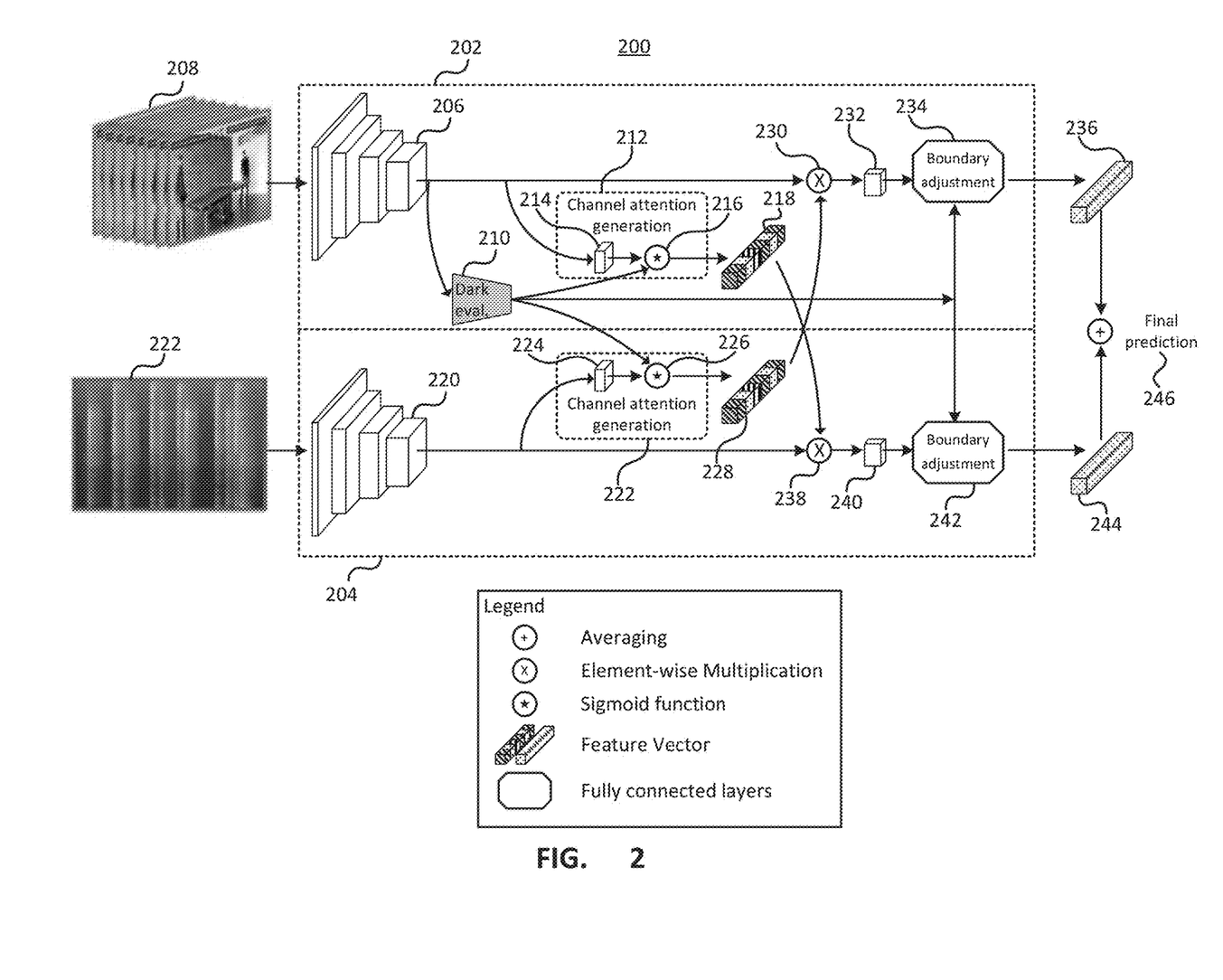
FIG. 2 depicts a further process for predicting an activity from video comprising audio and video captured in a dark environment.

FIG. 2 depicts a further process for predicting an activity from video comprising audio and video captured in a dark environment. The model 200 comprises a sight processing stream 202 and a sound processing stream 204. The sound stream 202 includes a convolutional neural network 206 that receives visual content 208 from the video and extracts features from the visual content 208. The extracted features may be processed by a darkness evaluation component 210 that generates a darkness-aware feature that provides an indication of the extent to which discriminative information can be extracted from the video. The darkness-aware feature may be used to modulate the features extracted by the convolutional neural network 206. The sight stream 202 comprises a channel attention generation module 212 that uses the darkness-aware feature and the extracted features, which may be passed through a 3D residual block 214 and sigmoid activation function 216 to generate an attention feature 218. The attention feature generated by the sight stream may then be passed to the sound stream for use in modulating the sound features.

The sound stream similarly comprises a convolutional neural network 220 that can extract features from the sound of the video, or more precisely a spectrogram of the sound. The extracted sound features may be passed to an channel attention generation module 222 of the sound stream 204 that uses a 2D residual block 224 and sigmoid activation function 226 to generate an attention feature 228. The attention feature 228 generated by the sound stream 204 is passed to the sight stream and may be used to modulate the extracted sight features, for example by performing element-wise multiplication 230 and passing the generated feature through a fully connected layer 232. The sight features that are modulated by the sound attention feature can be passed to a classifier 234 that has classification boundaries that can be adjusted dynamically based on the darkness aware feature. The classifier 234 outputs a prediction 236 of the activity classification.

Similarly, the sound stream 204 receives the attention feature 218 from the sight stream and uses it to modulate the extracted sound features, for example by performing element-wise multiplication 238 and passing the generated feature through a fully connected layer 240. The sound features that are modulated by the sight attention feature may be passed to a classifier 242 that has classification boundaries that can be adjusted dynamically based on the darkness aware feature. The classifier 242 outputs a prediction 244 of the activity classification.

The activity predictions for the video generated by each of the sight stream and the sound stream may be combined together to generate a final activity prediction. For example, the predictions may be averaged together, or may be combined using other weightings possibly based on the darkness-aware feature.

As described above, a model includes both a visual stream, which may include a network trained using videos captured under normal lighting conditions, and an audio stream. The model may also include a darkness evaluation module designed to assess the extent to which discriminative information can be extracted from the current visual input video. The model may further include a darkness-aware cross-modal channel attention module that produces channel attention feature vectors for each stream considering the other stream and the darkness-aware feature. Further, since the feature distribution of an activity class can deviate from the one under normal illuminations, the darkness-aware classifier rectifies the classification boundary of each stream also based on the darkness aware feature.

The sight stream 202 and sound stream 204 first work in parallel, extracting the feature of the visual and audio modalities, respectively. Then the darkness evaluation module takes the visual feature as input and outputs the darkness-aware feature. To adapt to low illuminations, for the two streams, the features outputted by the intermediate layers of the streams are modulated with channel attentions and passed to a respective classifier considering the darkness-aware feature and cross-modal information. The final classification prediction may be the average of the predictions of the two streams.

The sight stream can use a modern 3D convolutional network as the backbone, such as described in "Can spatiotemporal 3D CNNs retrace the history of 2D CNNs and imagenet" by Hara et al. in CVPR, 2018; "Identity mappings in deep residual networks" by He et al. in ECCV, 2016; "Aggregated residual transformations for deep neural networks" by Xie et al. in CVPR, 2017; and "Wide residual networks" by Zagoruyko et al. in BMVC, 2016, all of which are incorporated herein by reference in their entirety. The 3D convolutional network may be pre-trained under normal illumination conditions. The sight stream typically takes a video clip Vi of size $T_v \times H_v \times W_v \times 3$ as input and outputs the classification probability distribution $P_v \in \mathbb{R}^K$, where K is the number of classes. The sound stream may adopt a ResNet-18 as the backbone. The raw audio clip may be transformed into a spectrogram $A_i \in \mathbb{R}^{257 \times 500 \times 1}$ which becomes the input to sound stream network. It outputs the recognition prediction $P_a \in \mathbb{R}^K$ parallel to the sight stream.

For videos under low illumination, assessing whether the sight-only model can extract discriminative features is desirable. To this end, a darkness evaluation module $\Phi_d$ is trained to produce darkness-aware features. The darkness evaluation module may include a 3D residual block with the same structure as the backbone network of the sight stream, such as a 3D convolutional network, followed by a fully connected layer. The darkness evaluation module takes the intermediate features $F_v \in \mathbb{R}^{T' \times H' \times W' \times C_v}$, where H' and W' are the height and width of the feature maps, T' is the temporal length and $C_v$ is the channel number, from the sight stream as inputs. The training may be a binary classification problem that outputs a single score $D \in \mathbb{R}$ indicating whether the visual content can provide discriminative features.

For training the darkness evaluation module, the illuminance of each video may be determined by:

$$Y = \frac{\sum_{j=1}^{H_v \times W_v}(0.299R_j + 0.587G_j + 0.144B_j)}{H_v \times W_v}, \quad (1)$$

where $R_j$, $G_j$, and $B_j$ are the intensities of the red, green and blue channels of the $j^{th}$ pixel. It is observed that videos captured in the dark commonly satisfy Y<50. For a training set with N videos, first the predictions of the sight-only model are obtained. For videos captured in the dark, for example based on the illuminance, those on which the sight-only model can make correct predictions are treated as positive samples. For videos captured under normal illuminations, their brightness may be reduced, for example by the method proposed in "Image processing by linear interpolation and extrapolation" by Heiberli et al. in *IRIS Universe Magazine*, 28: 8-9, which is incorporated herein by reference in its entirety, to generate videos with low illuminations. The videos that still enable the sight-only model to recognize successfully are added into positive samples, while the rest are negative ones. Finally, the darkness evaluation module is trained by binary cross-entropy loss on these collected positive and negative videos.

Once the training has finished, the output from the penultimate layer of $\Phi_d$ is adopted as the darkness-aware feature representation for each video:

$$f_d = \Phi'_d(F_v), \quad (2)$$

where $\Phi'_d$ denotes the module obtained by removing the final layer from $\Phi_d$ and $F_d \in \mathbb{R}^{2048}$ is the darkness-aware feature.

In order to exploit complementary cross-modal information, the current model uses the feature of one modality to generate channel attention for the other modality. The channel attention is used to filter out noise so that the models can focus on relevant patterns, while the result can be sensitive to the illuminations. For example, when the visual content is too dark, the sight-only model cannot effectively extract discriminative features for recognition and the attention for the sound stream generated by such noisy features can erase important channels. Therefore, most channels of the sound stream should be preserved in such a situation. Similarly, the channel attention for the sight steam are also expected to preserve as much information as possible. To this end, the darkness-aware cross-modal channel attention module can dynamically adjust the sparsity of the channel attentions according to the illumination conditions.

The attention generation procedure of both the visual and audio streams is similar and the sound stream attention generation feature is described below as an example. The features $F_v$ of the sight stream is passed through a 3D residual block and a fully connected layer, denoted as $\Phi_{v4a}^{att}$, to generate a feature vector $f_a^{att} = \Phi_{v4a}^{att}(F_v)$, $f_a^{att} \in \mathbb{R}^{1 \times 1 \times C_a}$, where $C_a$ denotes the number of channels, and the channel attention is generated by:

$$M_a^i = \frac{1}{1 + e^{-\tau_a f_a^{att,i}}}, \quad (3)$$

where i indicates the $i^{th}$ channel, $M_a$ is the generated attention, and $\tau_a$ is the temperature that is dynamically changed per video. To obtain $\tau_a$, $f_d$ is passed through three fully connected layers, for example $\tau_a = \Phi_{v4a}^t(f_d)$. Then, the modulated feature of the sound stream is obtained by:

$$F'_a = M_a \odot F_a, \quad (4)$$

where $F_a \in \mathbb{R}^{H'_a \times W'_a = C_a}$, ($H'_a$ and $W'_a$ are the height and width of feature maps) is the intermediate feature of the sound stream and $\odot$ indicates channel-wise multiplication. Then $F'_a$ is sent into the remaining part of the sound network, as shown in FIG. 2. In this way, the model learns to dynamically adjust the amount of noise filtered out per video according to the illumination. The channel attention generated for the sight stream is generated in the same way according to:

$$f_v^{att} = \Phi_{a4v}^{att}(F_a), f_v^{att} \in \mathbb{R}^{1 \times 1 \times C_v}, \qquad (5)$$

$$M_v = \frac{1}{1 + e^{-\tau_v f_v^{att}}}, \qquad (6)$$

$$F'_v = M_v \odot F_v, \qquad (7)$$

Where $\Phi_{a4v}^{att}$ represents a residual block and fully connected layer, $\tau_v$ is the temperature, $f_v^{att}$ is the feature vector for generating attention, $M_v$ is the channel attention for the sight stream and $F'_v$ is the modulated feature. Similar to the estimation of $\tau_a$, $\tau_v$ is also predicted by passing $f_d$. fd through three fully connected layers, for example $\tau_v = \Phi_{a4v}'(f_d)$.

A cross-entropy classification loss can be adopted to train the channel attention generation module, i.e. parameters of $\Phi_{v4a}^{att}$, $\Phi_{a4v}^{att}$, $\Phi_{a4v}^{\tau}$, while fixing the parameters of the other parts of the model.

The feature distributions of videos in the dark can deviate from those under normal illuminations. Therefore, the classification boundaries, i.e. the parameters of the classification layer, should be adaptive according to the illumination. To this end, a darkness-aware classifier can be trained, whose parameters used for classification prediction can be dynamically adjusted by the darkness-aware feature. For the sight-only model, the weights and biases of its original fully connected layer for classification are denoted as $W_v^1$ and $b_v^1$. Another set of weights and biases can be learned on videos in the dark, denoted as $W_v^1$ and $b_v^2$. These two sets of parameters are combined through a darkness-aware coefficient $\lambda_v$ produced by $f_d$. As a result, when under low illumination, the parameters of the classification layer are:

$$W_v = \lambda_v * W_v^1 + (1 - \lambda_v) * W_v^2, \qquad (8)$$

$$b_v = \lambda_v * b_v^1 + (1 - \lambda_v) * b_v^2, \qquad (9)$$

Figure 3:
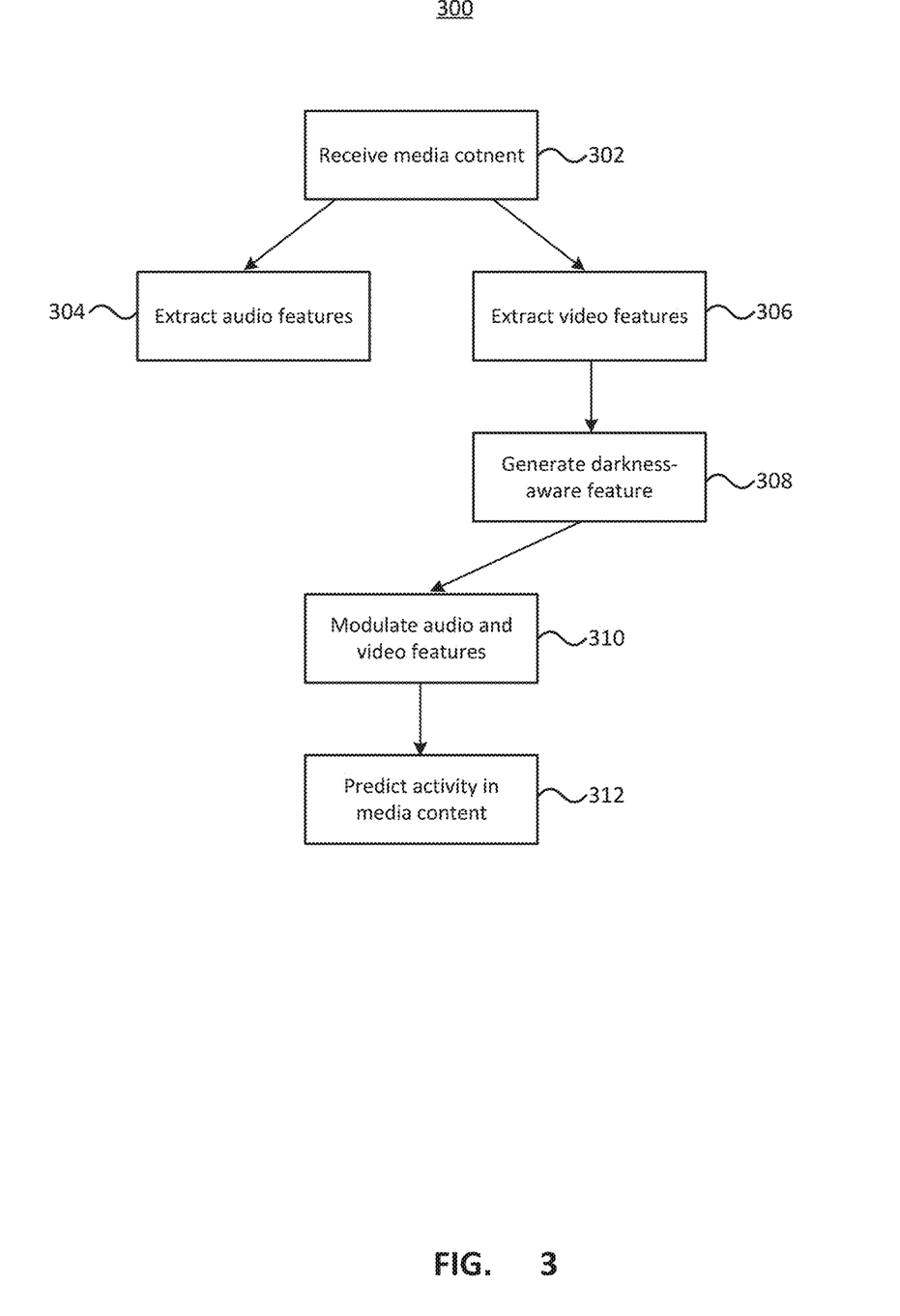
FIG. 3 depicts a method for predicting an activity from video comprising audio and video captured in a dark environment.

$\lambda_v$ may be obtained by passing $f_d$ through three fully connected layers, denoted as $\lambda_v = \Phi_b(f_d) =$. The classifier boundary of the sound stream is adjusted in the same way as the sight stream. Similar to the darkness-aware channel attention, the parameters of the module, i.e. $W_v^2$, $b_v^2$ and $\Phi_b$ can be trained by cross-entropy loss fixing the rest of the model. For training data, videos captured in the dark and videos captured in normal lighting conditions that have had the brightness lowered to provide "fake" dark videos may be used FIG. 3 depicts a method for predicting an activity from video comprising audio and video captured in a dark environment. The method 300 receives media content (302) to be processed. The media content includes both video content that may have been captured in a dark environment along with one or more channels of corresponding audio. The audio is used to extract audio features (304), which may include transforming the raw audio into corresponding spectrogram. The video content is used to extract video features (306). The video feature extraction and audio feature extraction can be performed independently of each other, possibly in parallel. The extracted video features are used to generate a darkness-aware feature (308). The darkness aware feature provides an indication of the ability to extract discriminative information from the video content. The darkness-aware feature is used to modulate both the video and audio features (310). Modulating the video and audio features may be done using respective channel attentions generated from the other stream. That is, the audio features may be modulated using the darkness-aware feature and a channel attention generated from the video features. Similarly, the video features may be modulated using the darkness-aware feature and a channel attention generated from the audio features. The modulated features may then be used to predict an activity occurring in the media content (312). The prediction may be done by generating individual predictions based on the modulated audio features and the modulated video features and then combining the predictions together. The individual predictions may be done using respective classifiers. The classification boundaries used may be modified dynamically based on the darkness aware feature.

Figure 4:
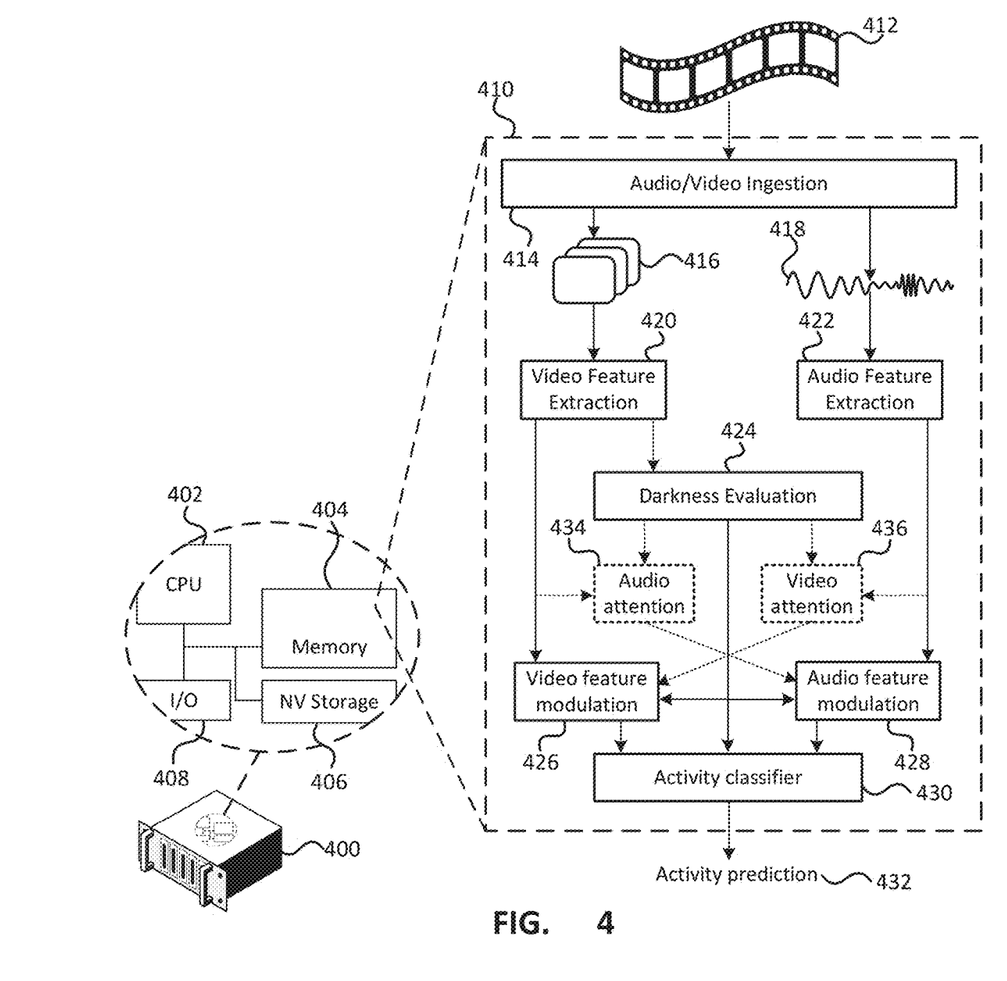
FIG. 4 depicts a computer system configured to predict an activity from video comprising audio and video captured in a dark environment.

FIG. 4 depicts a computer system configured to predict an activity from video comprising audio and video captured in a dark environment. The system 400 is depicted as a server, however the functionality described herein can be implemented on one or more servers or computer systems. The system 400 comprises at least one processing unit 402 for executing instructions. A memory unit 404 stores data and instructions that are executed by the processing unit 402. The memory unit 404 may provide volatile short term storage, however the system 400 may also include non-volatile storage 406 for additional storage. The system may include one or more input/output (I/O) interfaces 408 for connecting one or more additional components to the system 400. The instructions stored in the memory 404 can be executed by the processor 402 to provide various functionality 410 as described further below.

The functionality 410 provides various components for automatically recognizing activities occurring in a video 412 that may have been captured in a dark environment. The functionality 410 may include audio video ingestion functionality 414 that can receive AV content and generate corresponding video portions 416 and audio portions 418 that can be processed for counting the repetitive actions. The video portions 416 may comprise one or more frames of the video 412, while the audio portions 418 may comprise a spectrogram of the audio of a corresponding time range from the video 412. The video portion 416 is processed by feature extraction functionality 420 which generates video features and the audio portion 418 is processed by feature extraction functionality 422 which generates audio features. The features may be provided as respective feature vectors or other possible structures. The feature extraction functionality 420, 422 may generate multiple sets of video and audio features for subsequent use by other functionality. The feature extraction functionality may be provided by various model architectures. A darkness evaluation component 424 receives the extracted video features and processes them in order to output an indication of the ability to extract discriminative information from the video. As will be appreciated, videos captured under normal lighting conditions will generally have more discriminative information compared to videos captured in the dark.

The output of the darkness evaluation component 424 is used by video feature modulation functionality 426 and audio feature modulation functionality 428. The video feature modulation functionality receives the output from the darkness evaluation component and the output from the video feature extraction functionality and modulates the video features based on the darkness evaluation of the video. Similarly, the audio feature modulation functionality modulates the audio features from the audio feature extraction functionality based on the output from the darkness evaluation functionality.

The modulated video and audio features may be processed by activity classifier functionality 430 that outputs a prediction of one or more activities captured in the video. The activity classifier functionality may generate separate activity predictions based on each of the modulated video features and modulated audio features and then combine the two separate predictions into the final activity predictions 432, for example by averaging the two predictions together.

In order to validate the effectiveness of the sight and sound model for activity recognition in the dark, datasets are needed that allow for multimodal analysis and assure sufficient instances of videos recorded in darkness. XD-Violence, Kinetics-Sound and Moments-in-Time meet the criteria. Yet, they still mainly contain videos captured under normal illumination conditions, so the datasets were repurposed and reorganized to provide the Dark-Violence, Dark-Kinetics, and Dark-Moments datasets Dark-Violence: The XD-Violence dataset serves as the largest dataset for violence and non-violence detection with 4,754 untrimmed videos, including the soundtrack, and annotated by video-level classification labels. There are a total of 610 videos captured in the dark and the original test set merely contains a few. The training and test sets were reorganized. The new training set includes all the 4,144 videos under normal illumination conditions and 200 dark videos, while the remaining 410 dark videos form the test set.

Dark-Kinetics: The Kinetics-Sound dataset is a subset of the Kinetics-400 dataset for activity recognition with 18 classes that make sound. The original training and validation sets with around 20,000 and 1,400 video clips to learn the current model. Instead of directly using the original test set, the Dark-Kinetics dataset uses only videos captured in the dark, for evaluation. 133 videos were selected from the test set of Kinetics-Sound and to enlarge the number of videos, a further 325 videos were manually collected from the training and validation set of Kinetics-700, which are not in the training set of Kinetics-400. The final Dark-Kinetics dataset includes 458 dark videos captured in the wild for testing with their original annotations maintained.

Dark-Moments: The Moments in Time dataset is a large-scale human-annotated collection of one million short videos corresponding to 305 activity classes. It has a large coverage and diversity in both sight and sound modalities. The original training set of 727,305 video clips is used for model learning and the validation set of 30,500 clips for performance evaluation. 1,135 clips captured in the dark were further selected from the validation set, forming the Dark-Moments dataset to test the models in the dark.

Day2Dark-Moments: For many activities, videos captured during daytime are easy to be obtained, while nighttime videos can be scarce, such as the activity of nocturnal animals. Training on daytime videos only can lead a visual model to fail in the dark. To further investigate how the sound can help in daylight to darkness generalization, the Moments-in-Time dataset was reorganized and introduce a new challenging task, in which the training set contains daylight videos only and dark videos form the testing set. 54 classes were selected out of 305 classes, for which most videos are under normal illuminations. Then the videos belonging to these classes were split to the training and validation set according to the illuminations. As a result, in this task, a model is expected to learn from daytime videos and generalize to nighttime testing videos.

Figure 5:
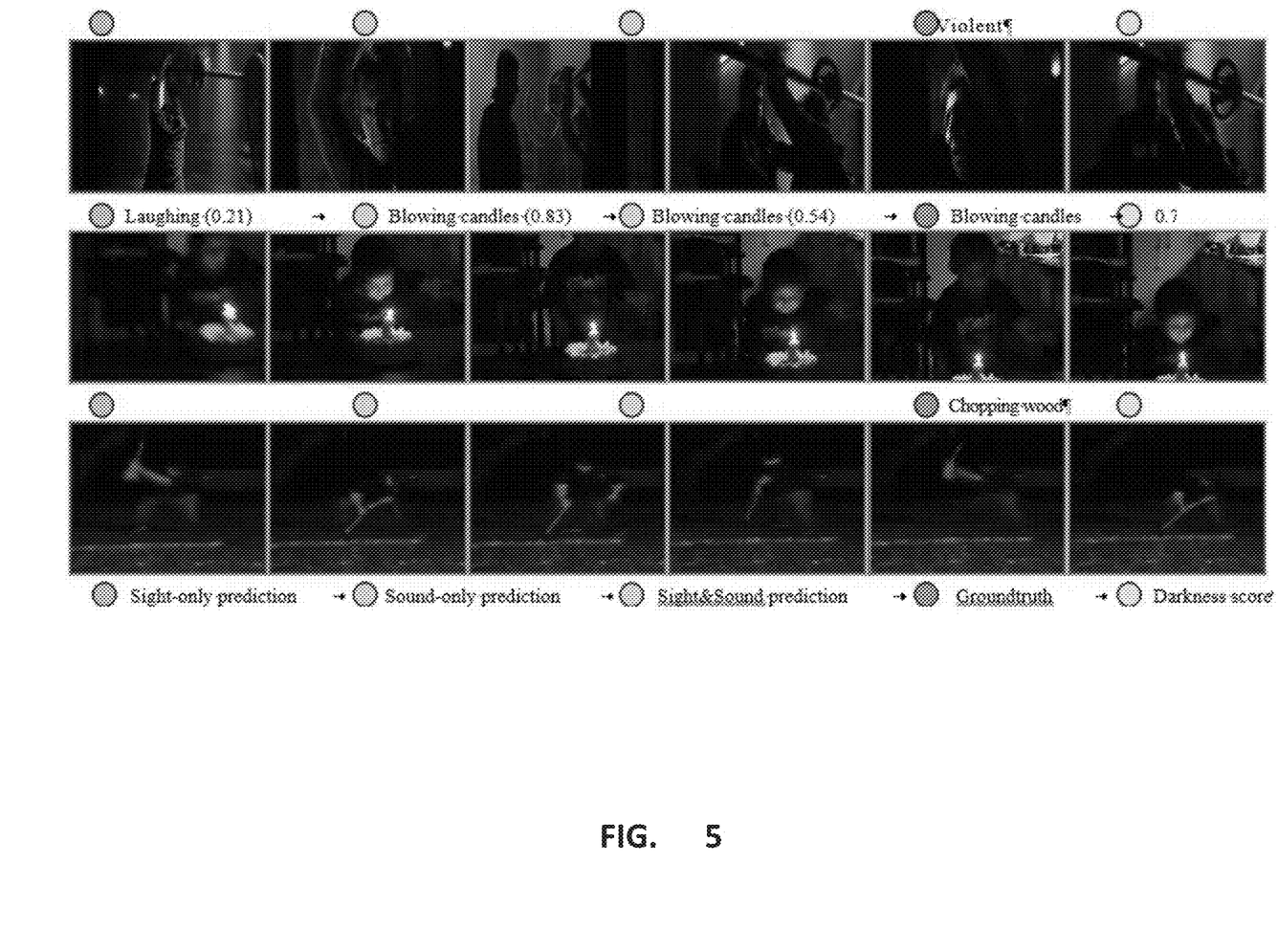
FIG. 5 depicts example videos from the Dark-Violence, Dark-Kinetics and Dark-Moments datasets and qualitative results of the activity prediction.

FIG. 5 depicts example videos from the Dark-Violence, Dark-Kinetics and Dark-Moments datasets and qualitative results for different components of the current model. The dataset statistics are summarized in Table 1 below.

TABLE 1

Activity recognition in the dark datasets

| Video dataset | Source(s) | Dark Test | Dark Train | Day Train | Activities |
|---|---|---|---|---|---|
| Dark-Violence | XD-Violence | 410 | 200 | 4144 | 2 |
| Dark-Kinetics | Kinetics-Sound & Kinetics | 458 | 1,760 | 18,541 | 18 |
| Dark-Moments | Moments-in-Time | 1,135 | 37,336 | 689,969 | 305 |
| Day2Dark-Moments | Moments-in-Time | 1,813 | 0 | 128,418 | 54 |

The activity recognition in the dark process was implemented using PyTorch with Adam optimizer and one NVIDIA GTX1080Ti GPU. For the sight stream, all input video frames were resized to 112×112, and each clip contains 16 frames. For Dark-Kinetics, the visual models trained on Kinetics-400 provided by Hara et al. was adopted. The publicly released visual model of Moments-in-Time was used for experiments on Dark-Moments and Day2Dark-Moments. For Dark-Violence, no off-the-shelf state-of-the-art visual model is available, so four NVIDIA GTX1080Ti GPUs were used to learn the sight-only model based on a ResNext 101 backbone. Weights were initialized from the Kinetics pre-trained checkpoint. Only the last residual block and the final classification layer were re-trained. The multi-instance learning strategy was adopted with a batch size of 4. The training takes 30 epochs with an initial learning rate of $10^{-2}$ gradually decreased to $10^{-4}$. For the sound stream, a ResNet-18 for all datasets and initialize the weights from the VGGSound pre-trained checkpoint. The last residual block and the final classification layer were re-trained to adapt to different datasets with an initial learning rate of $10^{-2}$ that is gradually decreased to $10^{-4}$, using a batch size of 16. For the darkness evaluation module, the training takes 15 epochs with an initial learning rate of $10^{-2}$ decreased gradually to $10^{-4}$ with a batch size of 2.

For the cross-modal channel attention & classifier, each module is trained separately but with the same strategy. During training, for videos captured under normal illuminations, their brightness is lowered, while keeping videos captured in the dark with their original visual content. The modules are trained on the whole training set by 35 epochs with an initial learning rate of $10^{-2}$ that is gradually decreased to $10^{-4}$. Then the modules were fine tuned on videos captured in the dark with a learning rate of $10^{-4}$ for 20 epochs. The batch size is set to 16. For experiments on Day2Dark-Moments, daylight videos only were used without the final fine-tune stage as no dark videos are available.

Once trained the model's performance was evaluated. As described above, the model may include three darkness-aware components: the darkness evaluation component, the cross-modal channel attention component, and the adaptive classifier component. The performance of several network variants on Dark-Kinetics were evaluated to validate the efficacy of each component. The results are shown in Table 2. "Attention w/o temperature" indicates the channel attention without the "temperature". It is generated from the visual feature under the sight-only setting, while adopting a cross-modal scheme as described above for the audiovisual setting. The "Attention & classifier" variant uses the feature outputted by the penultimate layer of the sight-only model to replace the darkness-aware feature for generating the temperature and coefficient. For "Darkness-aware attention" and "Darkness-aware attention & classifier", the visual feature was used to generate the channel attention under the sight-only setting, while combining sight and sound by the method described above.

TABLE 2 activity recognition accuracy for different models

| Model component | Accuracy |
| --- | --- |
| Sight or Sound | |
| Sight model | 0.445 |
| Sound model | 0.557 |
| Sight & Sound | |
| Late fusion | 0.646 |
| Attention | 0.736 |
| Attention & classifier | 0.739 |
| Darkness-aware attention | 0.753 |
| Darkness-aware attention & classifier | 0.762 |

In isolation, the sound stream performs better than the sight stream on dark videos, with an accuracy of 0.557. When the sight and the sound streams are combined by averaging their predictions, the accuracy increases to 0.646 and is superior to the variants of the sight-only model. This demonstrates the audio signals provide useful temporal information. Illumination-insensitive audiovisual models, i.e. "Attention" and "Attention & classifier", achieve inferior accuracy of 0.736 and 0.739, compared to 0.753 by the model with darkness-aware cross-modal channel attention. Therefore, it is believed that the darkness evaluation module can provide useful information of sight conditions. However, when the classifier boundary is further adjusted by the darkness feature, the best result with an accuracy of 0.762 is obtained.

The current sight & sound model for activity recognition in the dark was also compared with a sight-only model that takes the enhanced frames produced by KinD as inputs. As shown in Table 3, image enhancement can only contribute to limited performance improvement over the sight-only model.

TABLE 3

Sight and sound model vs image enhancement

| Model | Accuracy |
| --- | --- |
| Sight model | 0.225 |
| KinD enhanced sight model | 0.183 |
| Sight & sound model | 0.250 |

Table 4, provides the results of the current model for video recognition in the dark on three tasks, with ResNext-101 architecture as the backbone for the sight stream. On Dark-Kinetics and Dark-XD-Violence, the sound-only model outperforms the sight-only model under low illuminations, as activities in these two datasets usually come along with informative audio signals. After combining the sight and the sound models with the darkness-aware cross-modal components, the best result is obtained with accuracy of 0.762 and 0.955.

TABLE 4

Sight only and sound only models vs current multimodal model

| | Dark-Violence | Dark-Kinetics | Dark-Moments |
| --- | --- | --- | --- |
| Sight model | 0.815 | 0.445 | 0.214 |
| Sound model | 0.941 | 0.557 | 0.021 |
| Current model | 0.955 | 0.762 | 0.243 |

On Dark-Moments-in-Time, the sound-only model fails to conduct event classification with a very low accuracy of 0.021, as many event classes do not make distinguishable sound. However, the integration of the sound and the sight models improves over the accuracy of the sight-only model from 0.214 to 0.243.

Activity recognition under usual illumination. To further demonstrate the benefit of the current model, the method was also tested under usual illumination conditions as common in the literature. The model was trained and tested on the original partitions of Kinetics-Sound and Kinetics-400. The results are shown in Table 5. The model was applied only under low illuminations, otherwise the prediction of the sight-only model was used. Overall, the full sight and sound model achieves better performance compared to the sight-only model by higher accuracy on videos under low illuminations. Qualitative results for different components of the current model are depicted in FIG. 5.

TABLE 5 activity recognition under usual illumination

| | Kinetics-Sound | Kinetics-400 |
| --- | --- | --- |
| Sight model | 0.828 | 0.828 |
| Sound model | 0.631 | 0.111 |
| Current model | 0.829 | 0.828 |

Activity recognition from day to dark. As mentioned above, for some activities, videos captured in the dark can be scarce. Since the audio signals are expected to play an important role for activity recognition in the dark, the current model was applied to a new challenging task of daylight and darkness domains generalization, in which only videos under daylight are available for model learning and videos in the dark are for testing. The results are listed in Table 6. As the sound-only model fails to classify the events due to indistinguishable audio features, the sight-only counterpart shows poor generalization ability towards videos in the dark. However, the current darkness-aware sight and sound model outperforms the unimodal models by a large margin. This indicates that the current method enables good generalization ability for illumination gaps.

TABLE 6

Activity recognition from day to dark

| Model | Accuracy |
| --- | --- |
| Sound model | 0.072 |
| Sight model | 0.182 |
| Current model | 0.227 |

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A method for identifying an activity occurring in media content captured in different possible lighting conditions including low light conditions, comprising:
    receiving the media content comprising video content and audio content;
    extracting video features from at least a portion of the video content using a video model;
    extracting audio features from at least a portion of the audio content using an audio model;
    generating a darkness-aware feature by applying the video features to a darkness-aware evaluation model, the darkness-aware feature providing an indication of the ability to extract discriminative information from the video content;
    modulating the video features and the audio features using the darkness-aware feature to dynamically adjust an amount of noise filtered out according to illumination of the media content; and
    predicting an activity occurring in the media content using the modulated video and audio features by:
        generating an audio prediction by applying the modulated audio features to an audio classifier;
        generating a video prediction by applying the modulated video features to a video classifier; and
        combining the audio prediction and the video prediction to predict the activity occurring in the media content,
    wherein the darkness-aware feature is generated according to:

$$f_d = \Phi'_d(F_v),$$

where:
    $f_d$ is the darkness-aware feature;
    $\Phi'_d$ denotes the darkness-aware evaluation model obtained by removing a fully connected layer from $\Phi_d$;
    $\Phi_d$ comprises a 3D convolutional network followed by the fully connected layer, $\Phi_d$ trained as a binary classification problem with the fully connected layer outputting a single score $D \in \mathbb{R}$ indicating whether visual content can provide discriminative features;
    $F_v$ is the extracted video features.

2. The method of claim 1, wherein modulating the video features and audio features using the darkness-aware feature comprises:
    generating a video attention feature from the portion of the audio content and the darkness aware feature;
    generating an audio attention feature from the portion of the video content and the darkness aware feature;
    modulating the video features using the video attention feature; and
    modulating the audio features using the audio attention feature.

3. The method of claim 1, wherein generating the video prediction comprises adjusting classification boundaries of the video classifier based on the darkness-aware feature.

4. The method of claim 1, wherein generating the audio prediction comprises adjusting classification boundaries of the audio classifier based on the darkness-aware feature.

5. The method of claim 1, wherein combining the audio prediction and the video prediction comprises averaging the audio prediction and the video prediction together.

6. The method of claim 2, wherein the modulated video feature is generated according to:

$$F'_v = M_v \odot F_v,$$

wherein the modulated audio feature is generated according to:

$$F'_a = M_a \odot F_a,$$

where:
    $F'_v$ is the modulated video feature;
    $F'_a$ is the modulated audio feature;
    $M_v$ is the video attention from the portion of the audio content;
    $M_a$ is the audio attention from the portion of the video content;
    $F_v$ is the extracted video features;

F$_a$ is the extracted audio features; and

⊙ indicates channel-wise multiplication.

7. The method of claim 1, wherein extracting the audio feature from at least a portion of the audio content comprises transforming the audio content to a spectrogram and applying the spectrogram to the audio model.

8. The method of claim 1, wherein the video model is trained on video content captured in well lit conditions.

9. A non-transitory computer readable memory storing instructions which when executed by a processor of a computer system configure the computer system to perform a method comprising:

receiving the media content comprising video content and audio content;

extracting video features from at least a portion of the video content using a video model;

extracting audio features from at least a portion of the audio content using an audio model;

generating a darkness-aware feature by applying the video features to a darkness-aware evaluation model, the darkness-aware feature providing an indication of the ability to extract discriminative information from the video content;

modulating the video features and the audio features using the darkness-aware feature to dynamically adjust an amount of noise filtered out according to illumination of the media content; and     predicting an activity occurring in the media content using the modulated video and audio features by:

generating an audio prediction by applying the modulated audio features to an audio classifier;

generating a video prediction by applying the modulated video features to a video classifier; and         combining the audio prediction and the video prediction to predict the activity occurring in the media content,     wherein the darkness-aware feature is generated according to:

$$f_d = \Phi'_d(F_v),$$

where:

f$_d$ is the darkness-aware feature;

$\Phi'_d$ denotes the darkness-aware evaluation model obtained by removing a fully connected layer from $\Phi_d$;

$\Phi_d$ comprises a 3D convolutional network followed by the fully connected layer, $\Phi_d$ trained as a binary classification problem with the fully connected layer outputting a single score $D \in \mathbb{R}$ indicating whether visual content can provide discriminative features; and     F$_v$ is the extracted video features.

10. The computer readable memory of claim 9, wherein modulating the video features and audio features using the darkness-aware feature comprises:

generating a video attention feature from the portion of the audio content and the darkness aware feature;

generating an audio attention feature from the portion of the video content and the darkness aware feature;

modulating the video features using the video attention feature; and     modulating the audio features using the audio attention feature.

11. The computer readable memory of claim 9, wherein generating the video prediction comprises adjusting classification boundaries of the video classifier based on the darkness-aware feature.

12. The computer readable memory of claim 9, wherein generating the audio prediction comprises adjusting classification boundaries of the audio classifier based on the darkness-aware feature.

13. The computer readable memory of claim 9, wherein combining the audio prediction and the video prediction comprises averaging the audio prediction and the video prediction together.

14. The computer readable memory of claim 10, wherein the modulated video feature is generated according to:

$$F'_v = M_v \odot F_v,$$

wherein the modulated audio feature is generated according to:

$$F'_a = M_a \odot F_a,$$

where:

F'$_v$ is the modulated video feature;

F'$_a$ is the modulated audio feature;

M$_v$ is the video attention from the portion of the audio content;

M$_a$ is the audio attention from the portion of the video content;

F$_v$ is the extracted video features;

F$_a$ is the extracted audio features; and

⊙ indicates channel-wise multiplication.

15. The computer readable memory of claim 9, wherein extracting the audio feature from at least a portion of the audio content comprises transforming the audio content to a spectrogram and applying the spectrogram to the audio model.

16. The computer readable memory of claim 9, wherein the video model is trained on video content captured in well lit conditions.

17. A computer system comprising:

a processor for executing instructions; and a memory storing instructions, which when executed by the processor configure the computer system to perform a method comprising:

receiving the media content comprising video content and audio content;

extracting video features from at least a portion of the video content using a video model;

extracting audio features from at least a portion of the audio content using an audio model;

generating a darkness-aware feature by applying the video features to a darkness-aware evaluation model, the darkness-aware feature providing an indication of the ability to extract discriminative information from the video content;

modulating the video features and the audio features using the darkness-aware feature to dynamically adjust an amount of noise filtered out according to illumination of the media content; and         predicting an activity occurring in the media content using the modulated video and audio features by:

generating an audio prediction by applying the modulated audio features to an audio classifier;

generating a video prediction by applying the modulated video features to a video classifier; and             combining the audio prediction and the video prediction to predict the activity occurring in the media content,     wherein the darkness-aware feature is generated according to:

$$f_d = \Phi'_d(F_v),$$

where:

$f_d$ is the darkness-aware feature;

$\Phi'_d$ denotes the darkness-aware evaluation model obtained by removing the fully connected layer from $\Phi_d$;

$\Phi_d$ comprises a 3D convolutional network followed by a fully connected layer, $\Phi_d$ trained as a binary classification problem with the fully connected layer outputting a single score $D \in \mathbb{R}$ indicating whether visual content can provide discriminative features; and $F_v$ is the extracted video features.

\* \* \* \* \*